J. H. HARTER.
Horse Hay-Fork.
No. 204,035.  Patented May 21, 1878.
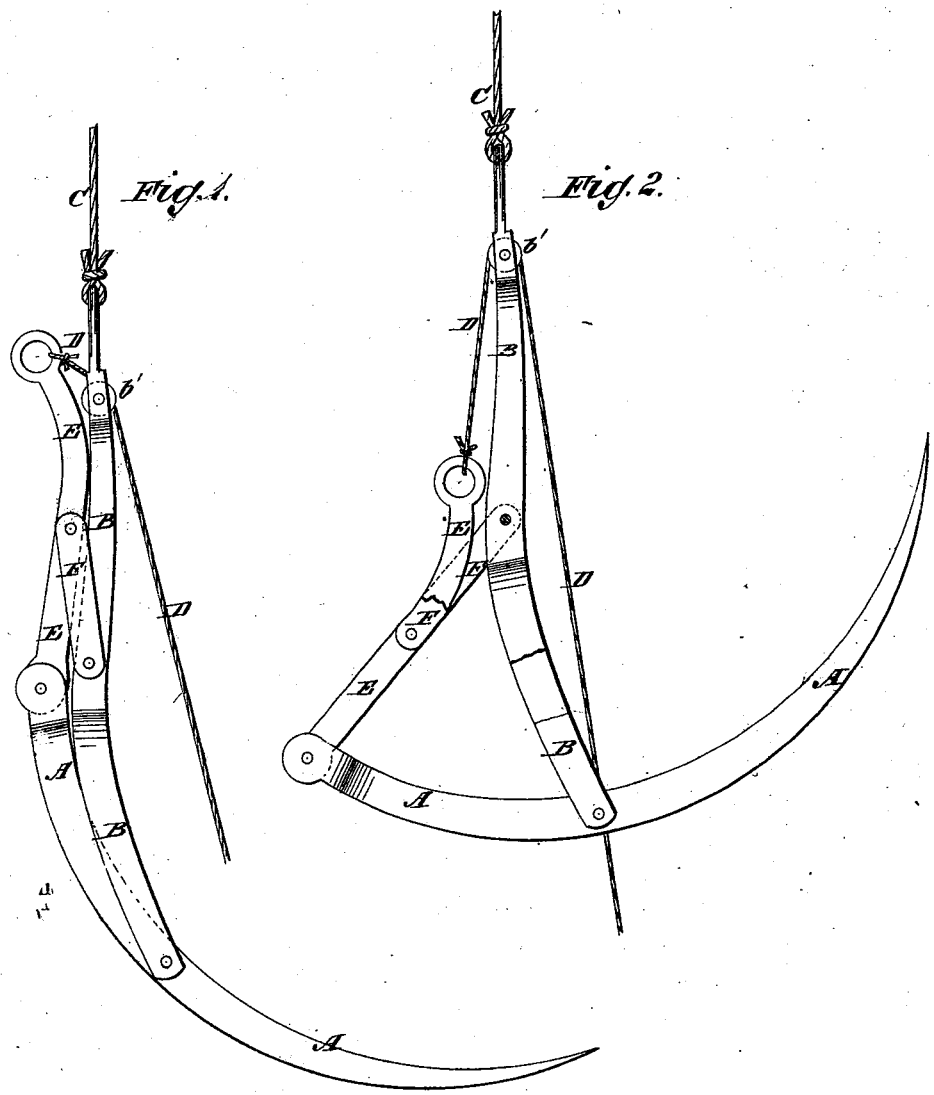
WITNESSES:
Francis McArdle.
J. H. Scarborough.
INVENTOR:
J. H. Harter.
BY Munn & Co
ATTORNEYS.

UNITED STATES PATENT OFFICE.

JOHN H. HARTER, OF NEVADA, OHIO, ASSIGNOR TO THE ANCHOR FORK COMPANY, OF SAME PLACE.

IMPROVEMENT IN HORSE HAY-FORKS.

Specification forming part of Letters Patent No. 204,035, dated May 21, 1878; application filed August 18, 1877.

*To all whom it may concern:*

Be it known that I, JOHN H. HARTER, of Nevada, in the county of Wyandot and State of Ohio, have invented a new and useful Improvement in Hay-Forks, of which the following is a specification:

Figure 1 is a side view of my improved hay-fork shown in position for loading and unloading. Fig. 2 is a side view of the same shown in position when loaded.

Similar letters of reference indicate corresponding parts.

The object of this invention is to furnish an improved hay-fork which shall be so constructed as to be easily inserted in the hay, which will pack the hay when loaded, and which shall be simple in construction and conveniently operated.

The invention will first be described in connection with the drawing, and then pointed out in the claim.

The fork is made with a single curved tine, A, to which is pivoted, a little in the rear of its center, the slotted lower end of the bar or standard B. The standard B is slightly curved. Upon its upper end is formed an eye, to receive the hoisting-rope C, and to it, in the bottom of said eye, is pivoted the pulley $b'$, over which the trip-cord D passes. The end of the trip-cord D is secured in an eye formed in the upper end of the bar E, the upper end of which is slightly curved outward, and its lower end is pivoted to the rear end of the curved tine A. To the opposite sides of the middle part of the trip-bar E are pivoted the outer ends of two connecting-bars, F, the inner ends of which are pivoted to the opposite sides of the middle part of the standard B.

With this construction the fork can be folded or closed into a compact form for storage and transportation, and in loading and unloading it.

In using the fork, it is folded into the form shown in Fig. 1, and is then thrust into the hay. The upper end of the standard B is then pushed forward, packing the hay between it and the forward part of the tine A, and extending the bars E F until the lower part of the bar E and the bars F come into or a little past a straight line. This locks the fork and holds the hay securely until the rake has been brought over the place where the hay is to be deposited. The cord D is then pulled, which unlocks the fork, and the weight of the hay brings the fork into the position shown in Fig. 1, and the hay slips off.

I am aware that horse hay-forks with several teeth with a knuckle-joint and adapted to be inserted into the hay up to the head are not new; but my single tooth may be inserted fully three and one-half feet. My lever for unlocking is much more convenient, and the parts connected with the tooth are so arranged that the device folds into a semicircle, and, when set, is reduced to an angle of about ninety degrees, thus forcing the hay into about half the space that it would usually occupy.

Having thus described my invention, I claim as new and desire to secure by Letters Patent—

A horse hay-fork consisting of single tine A, standard B, hinged near the middle of the tine, trip-bar E, and link-bars F F, said parts being connected and constructed as shown and described.

JOHN H. HARTER.

Witnesses:
C. W. BURKE,
ISRAEL HART.